(12) United States Patent
Furuta (10) Patent No.: US 12,522,040 B2
(45) Date of Patent: Jan. 13, 2026

(54) VEHICLE SUSPENSION CONTROL DEVICE (71) Applicant: TOYOTA JIDOSHA KABUSHIKI KAISHA, Toyota (JP)

(72) Inventor: Hiroki Furuta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/643,021

(22) Filed: Apr. 23, 2024

(65) Prior Publication Data

US 2025/0065681 A1  Feb. 27, 2025

(30) Foreign Application Priority Data

Aug. 25, 2023  (JP) ................................ 2023-137166

(51) Int. Cl.
*B60G 17/06* (2006.01)
*B60G 17/016* (2006.01)

(52) U.S. Cl.
CPC ................................. *B60G 17/016* (2013.01)

(58) Field of Classification Search
CPC .. B60G 17/016; B60G 17/017; B60G 17/018; B60G 17/06; B60G 17/08; B60G 2202/25; B60G 2400/204; B60G 2400/91; B60G 2400/252; B60G 2500/10; B60G 2500/30; B60G 2600/182; B60G 2800/162
See application file for complete search history.

(56) References Cited

U.S. PATENT DOCUMENTS

| | | | | |
|---|---|---|---|---|
| 5,276,621 A * | 1/1994 | Henry | ................ | B60G 17/0157 280/5.52 |
| 2003/0075882 A1* | 4/2003 | Delorenzis | .......... | B60G 17/056 280/5.508 |
| 2006/0142916 A1* | 6/2006 | Onuma | ................ | B60G 21/067 280/5.506 |
| 2011/0029198 A1* | 2/2011 | Mizuta | .................. | B60G 17/06 701/38 |
| 2021/0155264 A1* | 5/2021 | MacPherson | .......... | A61G 3/065 |
| 2022/0306138 A1* | 9/2022 | Ohno | .................. | B60W 30/146 |
| 2022/0370318 A1* | 11/2022 | Giles | ........................ | C11D 1/65 |
| 2023/0398991 A1* | 12/2023 | Chiba | ................. | B60W 30/182 |
| 2024/0059119 A1* | 2/2024 | Ali | ..................... | B60G 17/0165 |
| 2024/0359521 A1* | 10/2024 | Liu | ....................... | F16F 15/002 |

FOREIGN PATENT DOCUMENTS

| | | |
|---|---|---|
| JP | 2007-076572 A | 3/2007 |
| JP | 2007-166861 A | 6/2007 |

* cited by examiner

*Primary Examiner* — Hai H Huynh
*Assistant Examiner* — Johnny H Hoang
(74) *Attorney, Agent, or Firm* — SoraIP, Inc.

(57) ABSTRACT

The vehicle suspension control device includes one or more actuators that change stroke of a suspension of a vehicle having one or more doors, and an electronic control unit that controls the stroke by controlling the position of the one or more actuators. The electronic control unit executes an opening/closing determination process based on information on opening/closing of one or more doors, and a first acquisition process for acquiring a zero point in response to establishment of a first condition that is a condition for acquiring a zero point of a control position of one or more actuators at the time of stopping the vehicle, or in response to elapse of a predetermined time from the establishment of the first condition. The first condition includes that all of the one or more doors have been closed after at least one of the one or more doors has been opened.

6 Claims, 5 Drawing Sheets

VEHICLE SUSPENSION CONTROL DEVICE

CROSS-REFERENCE TO RELATED APPLICATION

This application claims priority to Japanese Patent Application No. 2023-137166 filed on Aug. 25, 2023 incorporated herein by reference in its entirety.

BACKGROUND

1. Technical Field

The present disclosure relates to a vehicle suspension control device.

2. Description of Related Art

Japanese Unexamined Patent Application Publication No. 2007-166861 (JP 2007-166861 A) discloses a vehicle suspension device. The suspension device includes a suspension main body that receives power provided from an electric motor, and a motor control device that controls the electric motor. The motor control device corrects a zero point of a current sensor based on the vehicle speed and the vehicle body acceleration.

SUMMARY

When the vehicle is stationary, the weight of a sprung portion of the vehicle is varied by getting on and off of a person and/or loading and unloading of a load, for example. When the weight on the sprung portion is varied, the neutral position of the suspension stroke is varied. Therefore, in a vehicle including an active suspension capable of controlling the suspension stroke by controlling the position of an actuator, it is required that the zero point of the control position of the actuator can be accurately acquired when the vehicle is stationary while assuming getting on and off of a person and/or loading and unloading of a load.

The present disclosure has been made in view of the above issue, and has an object to provide a vehicle suspension control device capable of accurately acquiring a zero point of a control position of an actuator for controlling a suspension stroke when a vehicle is stationary.

An aspect of the present disclosure provides a vehicle suspension control device including one or more actuators and an electronic control unit. The one or more actuators vary a stroke of a suspension of a vehicle having one or more doors, an electronic control unit controls the stroke through position control of the one or more actuators. The electronic control unit executes an opening and closing determination process of determining opening and closing of the one or more doors based on information about opening and closing of the one or more doors, and a first acquisition process of acquiring a zero point of a control position of the one or more actuators in response to establishment of a first condition or in response to a lapse of a predetermined time from the establishment of the first condition, the first condition being a condition for acquiring the zero point when the vehicle is stationary. The first condition includes all of the one or more doors being closed after at least one of the one or more doors is opened.

According to the present disclosure, it is possible to accurately acquire a zero point when a vehicle is stationary in consideration of variations in zero point due to getting on and off of a person and/or loading and unloading of a load.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. Vehicle Suspension Control Device

Figure 1:
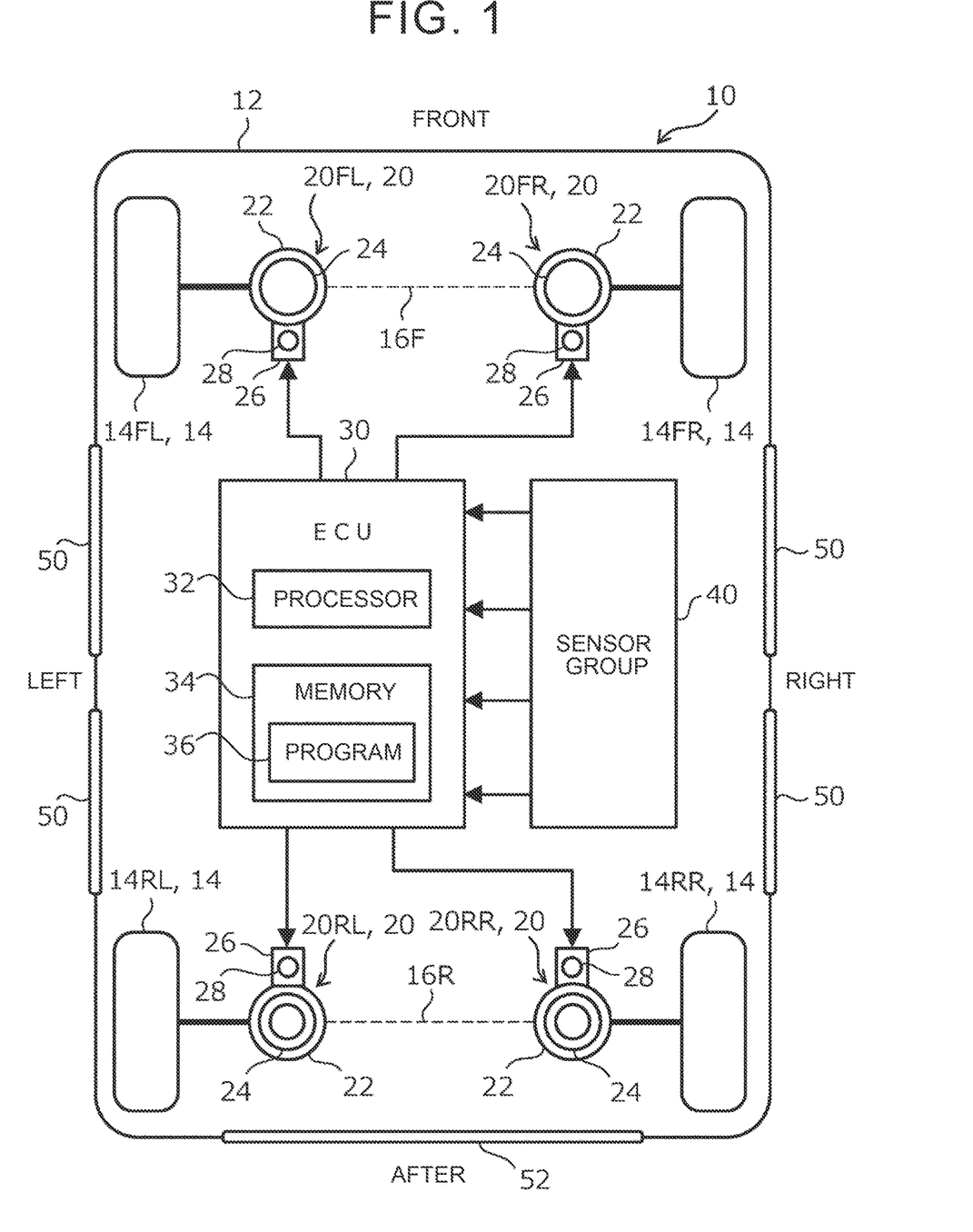
FIG. 1 is a diagram schematically illustrating an example of a configuration of a vehicle equipped with a vehicle suspension control device according to an embodiment.

FIG. 1 is a diagram schematically illustrating an example of a configuration of a vehicle 10 equipped with a vehicle suspension control device according to an embodiment. As shown in FIG. 1, the vehicle 10 includes four wheels 14. The four wheels 14 are a left front wheel 14FL and a right front wheel 14FR on the front shaft 16F, and a left rear wheel 14RL and a right rear wheel 14RR on the rear shaft 16R.

The vehicles 10 include a suspension 20FL, 20FR, 20RL and a 20RR as the suspensions 20 corresponding to the respective wheels 14. The suspensions 20FL, 20FR, 20RL and 20RR suspend the left front wheel 14FL, the right front wheel 14FR, the left rear wheel 14RL, and the right rear wheel 14RR from the vehicle body 12, respectively.

Each suspension 20 is an active suspension (full active suspension) and includes an actuator 26 in addition to the spring 22 and the shock absorber 24. In the vehicle 10, a portion of the members such as the wheels 14 and the shock absorber 24 that is closer to the wheel 14 than the spring 22 is referred to as "unsprung". A portion of the members such as the vehicle body 12 and the shock absorber 24 closer to the vehicle body 12 than the spring 22 is referred to as "sprung".

The actuator 26 is configured to actively apply a vertical control force between the sprung portion and the unsprung portion. The stroke of the suspension 20 is changed by the position control of the actuator 26. More specifically, the actuator 26 includes, for example, an electric motor 28 as a power source. In the example including the electric motor 28, the rotation angle (angular position) of the electric motor 28 corresponds to the control position of the actuator 26 that changes the suspension stroke.

As described above, the vehicle 10 includes the actuator 26 in each of the four wheels 14. Unlike this example, the actuator 26 may be provided only on any one, two, or three of the four wheels 14. The actuator for changing the suspension stroke by the position control may be, for example, an actuator of an active stabilizer device.

The vehicles 10 are equipped with an electronic control unit (ECU) 30. ECU 30 includes a processor 32 and memories 34 coupled to the processor 32. The processor 32 executes various processes related to active suspension control including position control of each actuator 26. The memory 34 stores various kinds of information necessary for execution of various kinds of processing by the processor 32. For example, the memory 34 stores a program 36 executable by the processor 32 and various pieces of information related to the program 36. When the program 36 is executed by the processor 32, active suspension control is realized.

ECU 30 acquires a signal from the sensor group 40 mounted on the vehicle 10. The sensor group 40 includes, for example, a steering angle sensor, a brake pedal sensor, an accelerator pedal sensor, a sprung acceleration sensor, a suspension stroke sensor, a current sensor, a resolver, a vehicle height sensor, and a wheel speed sensor. In addition, the sprung acceleration sensor detects, for example, an up-and-down acceleration, a left-and-right acceleration, and a front-and-rear acceleration of the sprung acceleration. The current sensor detects a current flowing through the electric motor 28. The resolver detects a rotation angle of the electric motor 28. In addition, the sensor group 40 may include a preview sensor that detects an uneven shape of a road surface in front of the vehicle 10.

The vehicle 10 (the vehicle body 12) includes one or a plurality of doors. As an example, the one or more doors include four doors 50 for getting on and off of a person, and a luggage door 52 for loading and unloading luggage. The sensor group 40 includes an opening/closing sensor (for example, a courtesy switch) that detects opening/closing of each of the doors 50 and 52. Further, the sensor group 40 may include, for example, a seating sensor or a seat belt sensor to determine the getting on and off of a person from the vehicle 10.

2. Zero Point Acquisition

In order to appropriately control the position of the actuator 26, it is required to correctly identify the zero point of the control position of the actuator 26 corresponding to the neutral position of the suspension stroke. More specifically, in the example of the actuator 26 utilizing the electric motor 28, the zero point is the zero point of the rotation angle of the electric motor 28.

At the time of stopping, for example, the sprung weight of the vehicle 10 is changed by getting on and off the person and/or loading and unloading the cargo (hereinafter, abbreviated as "getting on and off the person" or simply "getting on and off the person"). When the weight on the spring changes, the neutral position of the suspension stroke changes. Therefore, if the zero point is not updated in spite of the change in the sprung weight caused by the passenger getting on and off at the time of stopping, the electric motor 28 continues to generate the force by the weight change caused by the getting on and off from the time of getting on and off. The output of the motor 28 corresponds to the wasted energy consumption of the actuator 26.

Therefore, in the present embodiment, ECU 30 (processor 32) executes the following "opening/closing determination processing" and "first acquisition processing" in order to be able to accurately acquire the zero-point at the time of stopping the vehicle while assuming passengers getting on and off.

In the opening/closing determination process, ECU 30 determines the opening/closing of the doors 50 and 52 on the basis of information on the opening/closing of the doors 50 and 52 (hereinafter referred to as "door opening/closing information"). The door opening/closing information is, for example, information indicating an opening/closing state of each of the doors 50 and 52 based on a signal from the opening/closing sensor.

In addition, the door opening and closing information is not limited to being based on a signal from the opening and closing sensor. In instances where the vehicle 10 includes an electric door, such as a power sliding door, ECU 30 may determine that all of the doors 50 and 52 have been closed in the following manner even if all of the doors 50 and 52 have not been closed. That is, based on the control signal of the electric door, ECU 30 may determine that all of the doors 50 and 52 are closed when the vehicle 10 starts running (i.e., the vehicle speed is higher than zero) when the electric door, which is the only door 50 or 52 that is open, is operating in the closing direction.

In the first obtaining process, ECU 30 obtains a zero-point in response to the establishment of the first condition. The first condition is a condition for acquiring a zero point when the vehicle 10 is stopped. The first condition is that all of the doors 50 and 52 are closed after at least one of the doors 50 and 52 is opened. Alternatively, the first acquiring process may be a process of acquiring a zero-point in response to a lapse of a predetermined time T1 from the establishment of the first condition.

The zero point acquisition may be performed not only when the vehicle is stopped but also while the vehicle 10 is traveling as follows. That is, when the second condition, which is a condition for acquiring the zero point during the traveling of the vehicle 10, is satisfied, ECU 30 may acquire the zero point (the second acquiring process). The specific details of the second criterion will be described later together with S110 process of FIG. 2.

Figure 2:
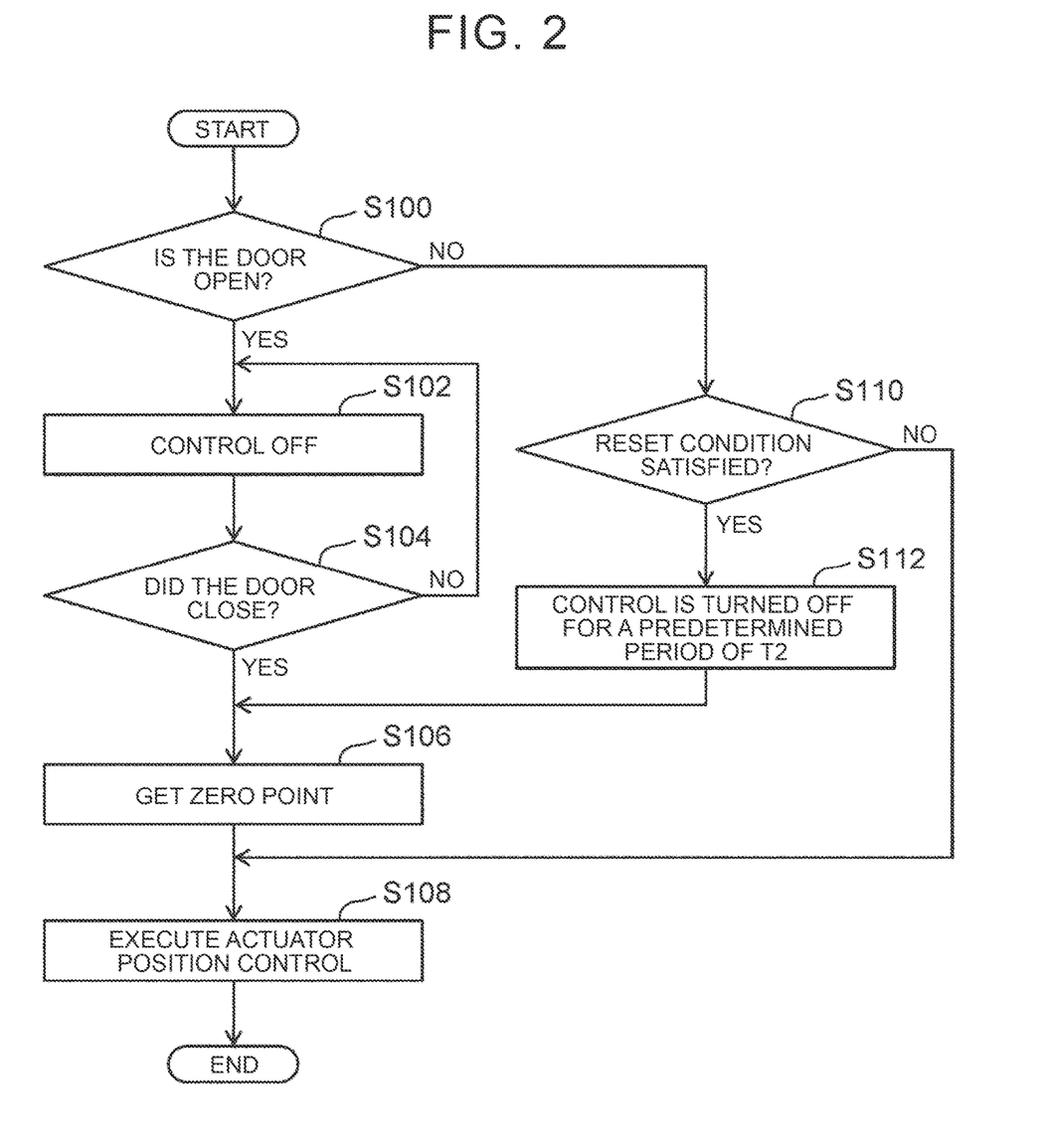
FIG. 2 is a flowchart illustrating a process related to acquisition of a zero point according to the embodiment.

FIG. 2 is a flowchart illustrating processing related to zero point acquisition according to the embodiment. The process of this flow chart is repeatedly executed by ECU 30 during the startup of the vehicle 10.

In S100, ECU 30 determines whether or not at least one of the doors 50 and 52 is open based on the door opening/closing data (opening/closing determination process).

If the determination of S100 is Yes, that is, if it can be determined that the vehicle 10 is stopped because at least one of the doors 50 and 52 is open, the process proceeds to S102. In S102, ECU 30 executes a process of temporarily stopping the output of the actuator 26 (the electric motor 28) as a preprocessing of acquiring an accurate zero-point. That is, ECU 30 turns off the position control of the actuator 26. More specifically, the term "control off" as used herein does not mean that the rotation angle of the electric motor 28 is fixed at 0 degrees, and the output current to the electric motor 28 is set to 0. In other words, the control-off indicates that the electric motor 28 only generates the back electromotive force and does not actively rotate the electric motor 28 according to a command from ECU In S104 following S102, ECU 30 determines whether or not all of the doors 50 and 52 are closed (opening/closing determination process). If the closed state is not established (S104; No), the process returns to S102, and the control-off state is continued.

On the other hand, when the above-described closed condition is satisfied (S104; Yes), that is, when the above-described first condition is satisfied, the process proceeds to S106. In S106, ECU 30 obtains zeros. Note that the process of acquiring the zero-point when the process proceeds from S104 to S106 corresponds to the first acquisition process described above. The process illustrated in FIG. 2 is not limited to the timing at which the closed state is established, and may be configured to proceed from S104 to S106 at a timing at which a predetermined time T1 has elapsed since the closed state was obtained.

Specifically, ECU 30 acquires a zero-point at a timing at which the process proceeds to S106. The zero point can be acquired by using the above-described resolver, for example. That is, ECU 30 acquires (updates) the rotation angle of the electric motor 28 detected by the resolver at the timing as the zero-point of the new rotation angle. In an example including a plurality of actuators 26 (electric motors 28) as in the example of the vehicle 10 illustrated in FIG. 1, the zero point is acquired with respect to the respective actuators 26 (electric motors 28).

In addition, when the process proceeds from S104 to S106 at a timing when the predetermined time T1 has elapsed since the closed state was obtained, ECU 30 may acquire (update) the mean of the rotational angles acquired by the resolver during the predetermined time T1 as a new zero-point.

After S106, the process proceeds to S108 to resume position control of the actuator 26. In S108, ECU 30 performs position control of the actuator 26 based on the currently set zeros. More specifically, the position control is executed (resumed) based on the zeros updated in S106 when the process proceeds from S106 to S108.

On the other hand, when the determination result of S100 is No, that is, when it can be determined that the vehicle 10 is traveling because all of the doors 50 and 52 are closed, the process proceeds to S110. In S110, ECU 30 determines whether or not the resetting condition is satisfied. Note that acquiring (updating) a new zero point of the rotation angle of the electric motor 28 is also referred to as "zero point reset". The above-described second acquisition condition is also referred to as a "reset condition".

The reset condition includes that the input on the spring is less than or equal to a threshold value. More specifically, the reset condition includes that the input to the suspension 20 at the future position of the vehicle 10 while traveling, the input to the spring in accordance with at least one of the steering of the vehicle 10, and the acceleration/deceleration of the vehicle 10 is equal to or less than a threshold value. As an example, the reset condition includes the following six conditions C1 to C6, and is satisfied when all of these conditions C1 to C6 are satisfied. The following road surface displacement related values are values related to road surface displacement, which is a vertical displacement of the road surface, and are, for example, road surface displacement itself, road surface displacement speed (time differential value of road surface displacement), unsprung displacement, unsprung speed, unsprung acceleration, sprung displacement, or sprung speed. The road surface displacement-related value can be acquired using, for example, the preview sensor described above or a database of high-precision map data.

C1: The road surface displacement-related value (estimated value) in the future position is less than or equal to the threshold value (that is, the road surface input in the future position is sufficiently small)
C2: The steering angle must be less than or equal to the threshold.
C3: The operating amounts of the brake pedal and the accelerator pedal are equal to or less than the thresholds
C4: The vertical acceleration of the spring is less than or equal to the threshold.
C5: Each of the left-right acceleration and the front-rear acceleration of the sprung portion is equal to or less than the threshold value
C6: Suspension stroke is less than or equal to the threshold.

In addition, the resetting condition may include only one or more of the conditions C1 to C6 that are not all. In addition, the resetting condition may include at least one of the conditions C1 to C6, or alternatively, the following conditions. That is, the reset condition may include that at least one of the required value of the active suspension control, the amount of operation of the actuator 26, and the output current to the electric motor 28 is equal to or less than a corresponding threshold value. In an example in which the vehicle 10 is an autonomous driving vehicle, a condition in which at least one of steering and acceleration/deceleration of the vehicle 10 is not performed during execution of the autonomous driving control may be used as a reset condition.

When the reset condition is not satisfied (S110; No), that is, when it can be determined that the timing suitable for performing the zero-point reset is not arrived during the traveling, the process proceeds to S108. As a result, the position control of the actuator 26 is executed (continued) without updating the zero point.

On the other hand, when the reset condition is satisfied (S110; Yes), that is, when it can be determined that a timing suitable for performing the zero-point reset has arrived during traveling, the process proceeds to S112. In S112, ECU 30 turns off the position control of the actuator 26 for a predetermined period of T2. This "control off" is performed in the same manner as the control off of S102. The predetermined time T2 may be the same as or different from the predetermined time T1 described above.

After S112, the process proceeds to S106. The zero-point acquisition when the processing proceeds to S106 in this way corresponds to the above-described second acquisition processing. More specifically, ECU 30 acquires (updates) the rotational angle of the electric motor 28 detected by the resolver at the timing when the predetermined period of T2 has elapsed as a new zero-point. Alternatively, ECU 30 may acquire (update) the mean of the rotational angles acquired by the resolver during the predetermined period of T2 as a new zero-point. In addition, there is a possibility that the reset-condition is not satisfied during the lapse of the predetermined period of T2. In this case, ECU 30 may acquire (update) the rotation angle at the time point when the reset condition is no longer satisfied or the rotation angle at the time point prior to the beginning of the predetermined time T2 (that is, the time point when the determination result of S110 becomes Yes) as a new zero-point.

At the time of stopping, the sprung weight changes mainly when a person gets on or off. According to the present embodiment described above, the zero-point is acquired in response to the establishment of the above-described first condition or in response to the elapse of a predetermined time T1 from the establishment of the first condition. When all of the doors 50 and 52 are closed after at least one of the doors 50 and 52 is opened, there is a possibility that a person gets on or off. Therefore, by using the first condition, it is possible to accurately acquire (update) the zero point before traveling in consideration of the change in the zero point caused by the influence of the passenger getting on or off. Thus, when the sprung weight actually changes, wasteful energy consumption of the actuator 26 caused by the fact that the zero point is not updated properly can be suppressed. In addition, since the useless use of the output of the electric motor 28 is suppressed, the suspension control performance is also improved.

In addition, strictly speaking, when all of the doors 50 and 52 are closed after at least one of the doors 50 and 52 is opened, there is a possibility that a change in the suspension stroke due to a change in the sprung weight caused by a passenger getting on and off or the like is not accommodated. In this regard, according to the embodiment in which the zero point is acquired in accordance with the lapse of the predetermined time T1 from the establishment of the first condition, the zero point can be acquired at a timing at which the change in the suspension stroke caused by the passenger getting on and off or the like is reliably settled.

Further, according to the present embodiment, the zero point is also acquired when the above-described second condition (reset condition) is satisfied. This makes it possible to acquire (update) the zero point in a state where the attitude change of the vehicle 10 is small during traveling. More specifically, a zero point reset can be performed without or with little input on the spring due to at least one of road surface input, steering, and acceleration/deceleration during travel. This makes it possible to ideally acquire a zero point during traveling. This also leads to a reduction in wasteful energy consumption and an improvement in suspension control performance.

3. Other Embodiments 3-1. Example of Considering Service Brake Operation

When the service brake is activated, there is a possibility that the front-rear force is generated in the vehicle 10 even when the vehicle is stopped. Therefore, even if the zero point reset is performed at the time of stopping, it may be difficult to obtain the zero point sufficiently accurately due to the operation of the service brake. Therefore, the above-described first condition regarding the execution of the first acquisition process may include that the service brake is off.

Figure 3:
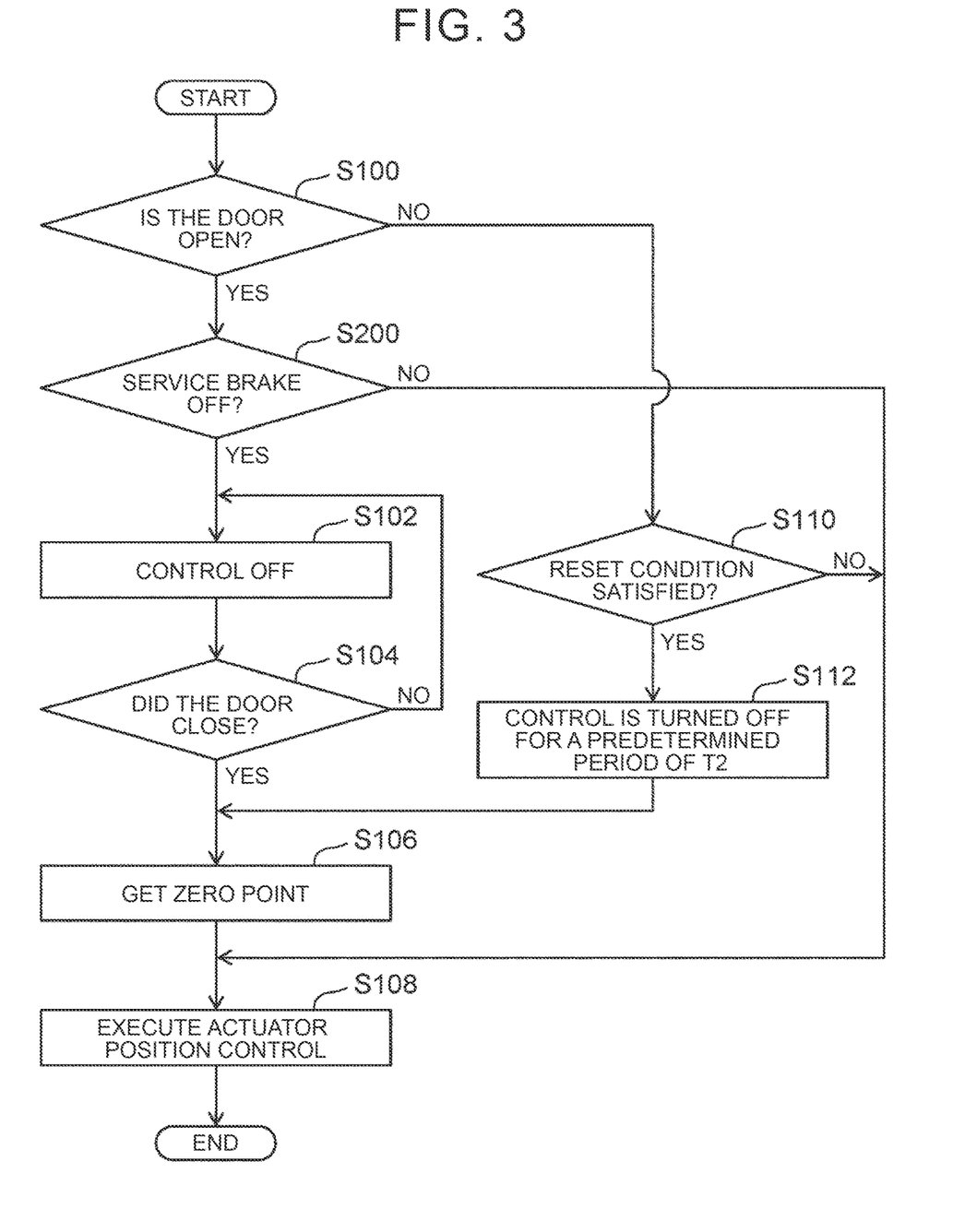
FIG. 3 is a flowchart illustrating a process related to acquiring a zero point according to another embodiment.

FIG. 3 is a flowchart illustrating a process related to zero point acquisition according to another embodiment. The flowchart shown in FIG. 3 is different from the flowchart shown in FIG. 2 in that S200 process is added.

In FIG. 3, if S100 determination is Yes, the process proceeds to S200. In S200, ECU 30 determines whether the service brake is off. This determination can be made, for example, by using the above-described brake pedal sensor.

When the service brake is off (S200; Yes), the processes after S102 are executed. That is, the first acquisition process is executed. On the other hand, when the service brake is on (S200; No), the process proceeds to S108. That is, the first acquisition process is not executed.

According to the processing illustrated in FIG. 3, the first acquisition processing at the time of stopping is also executed on condition that the service brake is off. By avoiding the situation in which the service brake is activated in this way, it is possible to more reliably acquire an accurate zero point at the time of stopping.

3-2. Example Involving Determination of Passengers Getting on and off

In this embodiment, ECU 30 determines whether or not a person gets on and off based on information (getting on and off information) related to getting on and off of a person with respect to the vehicles 10. When ECU 30 determines that the person does not get on or off even when the above-described first condition is satisfied, the zeros are not updated by the first acquiring process.

Figure 4:
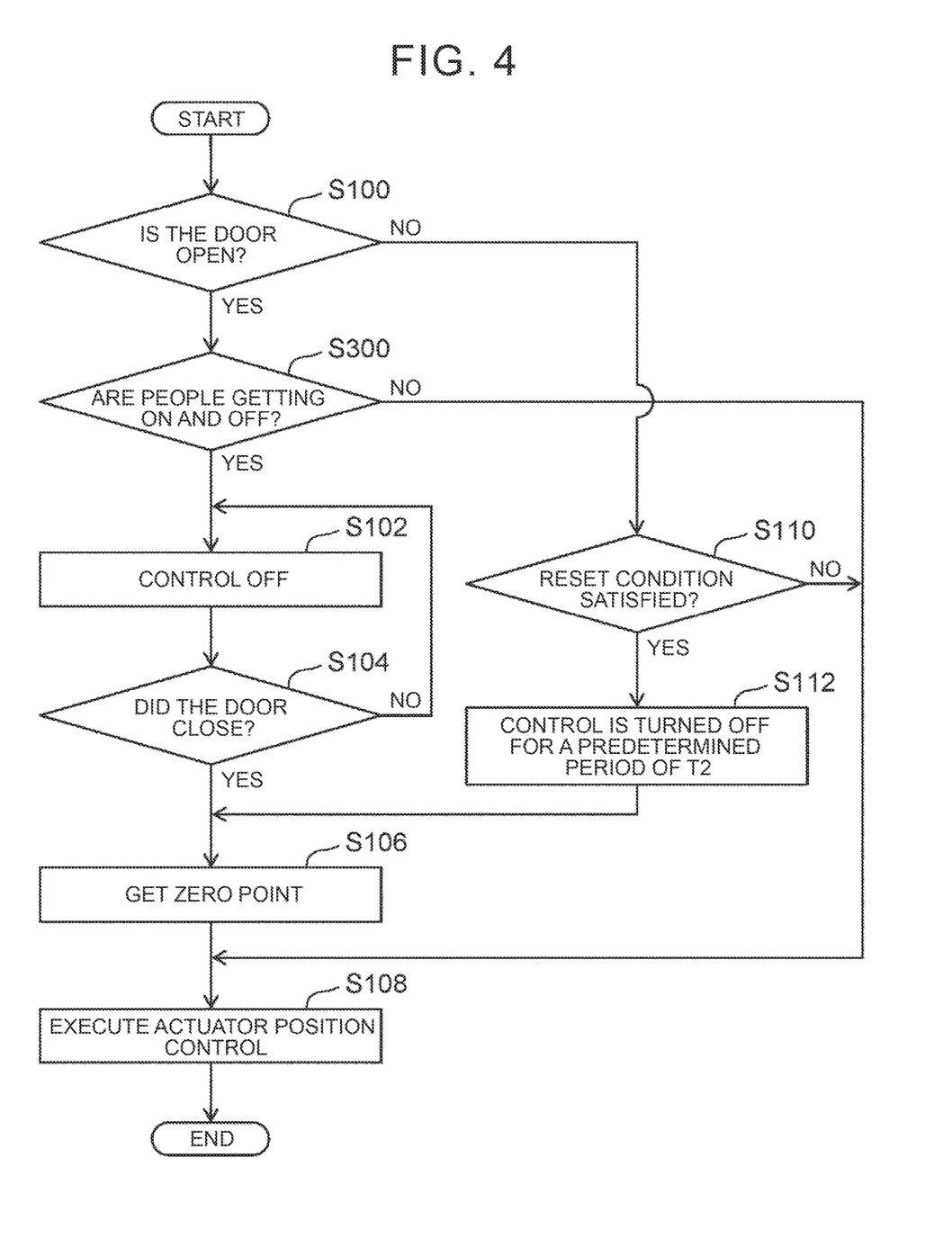
FIG. 4 is a flow chart illustrating a process related to acquiring zeros according to still another embodiment.

FIG. 4 is a flowchart illustrating processing related to zero point acquisition according to still another embodiment. The flowchart shown in FIG. 4 is different from the flowchart shown in FIG. 2 in that S300 process is added.

In FIG. 4, if S100 determination is Yes, the process proceeds to S300. In S300, ECU 30 determines whether or not a person gets on or off based on the getting-on/off data. The getting-on/off information is acquired using, for example, a sensor group 40 (for example, a suspension stroke sensor, a seating sensor, or a seat belt sensor).

When a person gets on or off (S300; Yes), the process after S102 is executed. That is, the first acquisition process is executed. On the other hand, when the passenger does not get on or off (S300; No), the process proceeds to S108. That is, the first acquisition process is not executed.

According to the process illustrated in FIG. 4, even in a situation where the first condition is satisfied, when it is determined that there is no passenger getting on or off by S300 process, the zero-point is not acquired (updated) at the time of stopping. As a result, the zero point acquired during the traveling before the current stopping time in which the determination that there is no passenger getting on or off is made is continuously used. Here, basically, it can be said that the zero point can be acquired with higher accuracy during traveling than at the time of stopping which can be affected by the operation of the service brake or the like. Therefore, according to the processing shown in FIG. 4, when it is determined that there is a possibility that the service brake is operating based on the determination that there is no passenger getting on or off while the vehicle is stopped, the zero point acquired during the traveling can be continuously used without performing the zero point reset.

In addition, in the "case involving determination of getting on/off of a person", ECU 30 may execute the following processing instead of the processing illustrated in FIG. 4. That is, ECU 30 may be configured such that the zeros are not updated when it is not determined that there is a passenger getting on or off in the process of sequentially executing S100, S102 and S104 processes and reaching S106 as illustrated in FIG. 2.

In addition, the "case involving determination of getting on/off of a person" may be executed with a process of S200 relating to the operation of the service-brake (see FIG. 3).

3-3. Example with Vehicle Height Control

This example relates to a vehicle suspension control device capable of executing vehicle height control as one of active suspension control. When a person gets on and off, the vehicle height control changes the vehicle height by using the suspension 20 in order to enhance the getting on and off performance. During the execution of the vehicle height control, a zero point cannot be acquired.

Therefore, when the second condition (resetting condition) is satisfied when the actuator 26 is controlled so as to change the vehicle height by the vehicle height control, ECU 30 gradually changes the "required control quantity" of the actuator 26 to reduce the generated force of the actuator 26 to 0, and then acquires the zero point by the second acquiring process.

Figure 5:
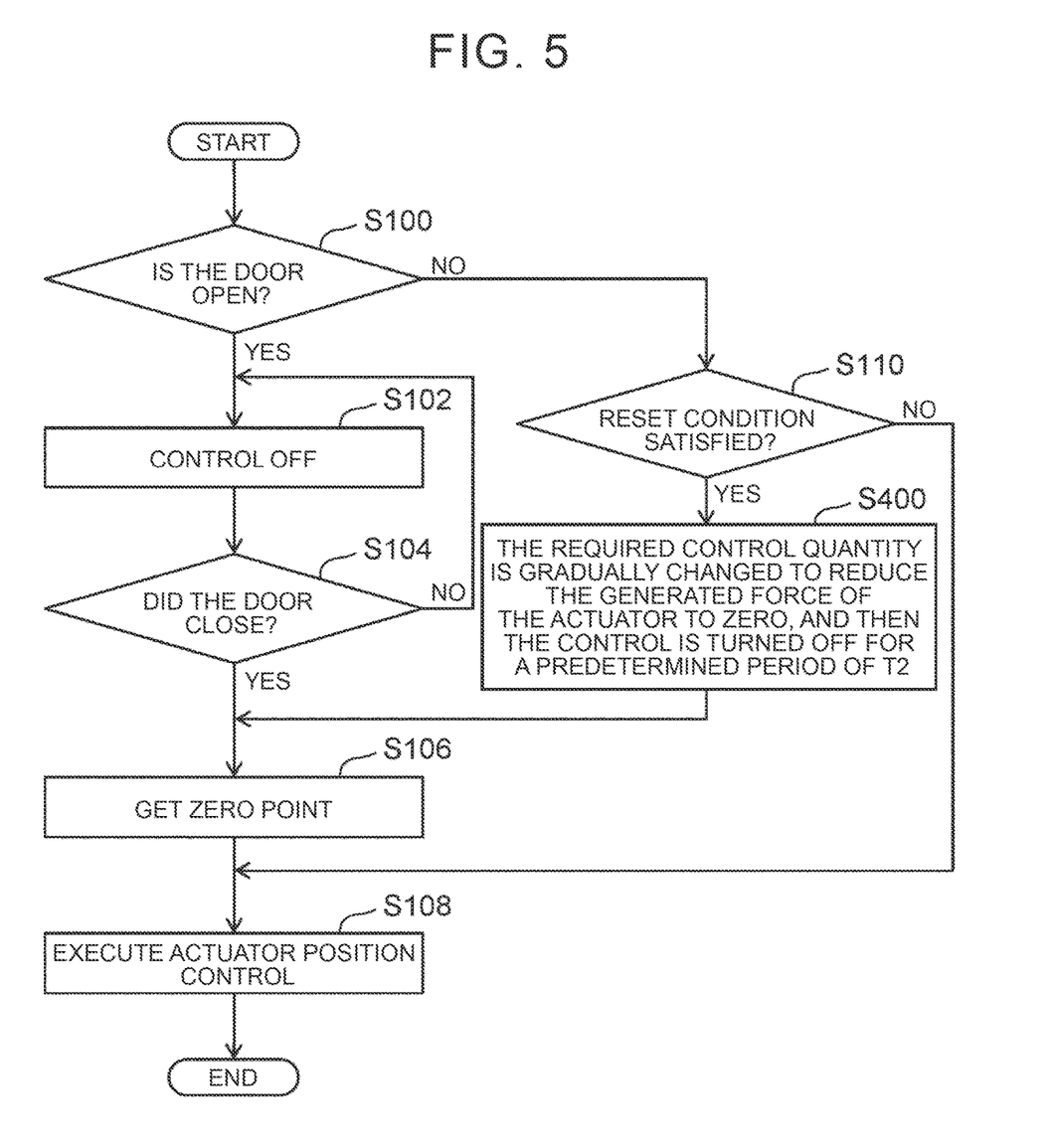
FIG. 5 is a flowchart illustrating processing related to zero point acquisition according to still another embodiment.

FIG. 5 is a flowchart illustrating processing related to zero point acquisition according to still another embodiment. The flowchart shown in FIG. 5 is different from the flowchart shown in FIG. 2 in that S112 processing is replaced with S400 processing.

In FIG. 5, if S110 determination is Yes, the process proceeds to S400. In S400, ECU 30 performs the above-described "control-off" with a gradual change in the required control amounts of the respective actuators 26.

More specifically, the required control amount is, for example, an output current to the electric motor 28. In this exemplary output current, ECU 30 reduces the generated force of the actuator 26 (motor 28) to zero by gradually reducing the output current to zero by controlling the output current. Alternatively, the required control amount may be, for example, a rotation angle of the electric motor 28. The example of the rotation angle corresponds to an example in which the required control amount is gradually changed while the position control of the actuator 26 (the angle control of the electric motor 28) for the vehicle height control is continued. ECU 30 gradually changes the rotational angle so that the current value becomes 0 while referring to the current value of the current sensor, thereby reducing the generated force of the electric motor 28 to 0.

Unlike the process illustrated in FIG. 5, if S112 process illustrated in FIG. 2 is abruptly executed when the determination result of S110 is Yes, the vehicle height may suddenly change. On the other hand, according to the processing illustrated in FIG. 5, it is possible to reduce the feeling of discomfort to the occupant due to the change in the posture of the vehicle 10 caused by the execution of the control off as the pre-processing for the zero point reset.

Alternatively, in place of the process illustrated in FIG. 5, if the second condition is satisfied while the vehicle height control is being executed, ECU 30 may execute S112, S106 and S108 processes (see FIG. 2) after the vehicle height control is completed, instead of the above-described process.

What is claimed is:

1. A vehicle comprising:
   a plurality of doors;
   an active suspension including an actuator, the actuator including an electric motor configured to change a stroke of the active suspension by changing a rotation angle of the electric motor;
   a sensor group including a current sensor configured to detect a current flowing through the electric motor, a resolver configured to detect the rotation angle of the electric motor, and a courtesy switch configured to detect opening and closing of each of the plurality of doors; and
   a processor configured to control the stroke through the actuator based on signals from the sensor group, wherein:
   the processor is further configured to
   determine whether at least one of the plurality of doors is open based on the signal from the courtesy switch,
   set a value of an output current to the electric motor to zero in response to the determination that at least one of the plurality of doors is open,
   determine whether all of the plurality of doors are closed based on the signal from the courtesy switch,
   set a zero-point rotation angle based on the rotation angle of the electric motor detected by the resolver in response to the determination that all of the plurality of doors are closed, the zero-point rotation angle corresponding to a neutral position of the stroke of the active suspension, and
   control the stroke based on the set zero-point rotation angle.

2. The vehicle according to claim 1, wherein the processor is further configured to set the zero-point rotation angle at a timing at which a first predetermined period has elapsed since the determination that all of the plurality of doors are closed has been made.

3. The vehicle according to claim 2, wherein the processor is further configured to set the zero-point rotation angle based on a mean value of the rotation angles of the electric motor detected by the resolver during the first predetermined period.

4. The vehicle according to claim 3 further comprising a brake pedal and an accelerator pedal, wherein:
   the sensor group further includes a steering angle sensor, a brake pedal sensor, an accelerator pedal sensor, a sprung mass acceleration sensor, a suspension stroke sensor, and a preview sensor configured to detect an uneven shape of a road surface in front of the vehicle, and
   the processor is further configured to
   determine whether a resetting condition is satisfied in response to the determination that no doors among the plurality of doors are open, the resetting condition including:
   (i) a road surface displacement-related value detected by the preview sensor being less than or equal to a first threshold value;
   (ii) a steering angle being less than or equal to a second threshold value;
   (iii) a brake pedal operating amount of the brake pedal being equal to or less than a third threshold value and an accelerator pedal operating amount of the accelerator pedal being equal to or less than a fourth threshold value;
   (iv) a vertical acceleration of a sprung portion of the vehicle being less than or equal to a fifth threshold value;
   (v) a left-right acceleration of the sprung portion being equal to or less than a sixth threshold value and a front-rear acceleration of the sprung portion being equal to or less than a seventh threshold value; and
   (vi) the stroke of the active suspension being less than or equal to an eighth threshold value,
   set the value of the output current to the electric motor to zero for a second predetermined period in response to the determination that the resetting condition is satisfied, and
   set the zero-point rotation angle based on a mean value of the rotation angles of the electric motor detected by the resolver during the second predetermined period.

5. The vehicle according to claim 4, wherein the second predetermined period is equal to the first predetermined period.

6. The vehicle according to claim 5, wherein the resetting condition further includes an actuator operation amount of the actuator being equal to or less than a ninth threshold value and the value of the output current to the electric motor being equal to or less than a tenth threshold value.

* * * * *